United States Patent Office 3,452,065
Patented June 24, 1969

3,452,065
SULFATE OR SULFONATE AMPHOTERIC
AMINE SALTS
Hans S. Mannheimer, 23 Haines Cove,
Toms River, N.J. 08560
No Drawing. Filed Aug. 11, 1966, Ser. No. 571,704
Int. Cl. C07c 141/02, 143/06, 139/00
U.S. Cl. 260—401                11 Claims

ABSTRACT OF THE DISCLOSURE

A compound within the generic formula

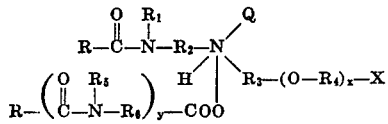

each R is of 6–24 carbon atoms and is independently selected from the group consisting of saturated and unsaturated aliphatic hydrocarbons whose unsaturation is due solely to ethylenic linkage, alkyl-aryl hydrocarbons wherein the alkyl portion is at least 6 carbon atoms and the aryl portion is mononuclear and the hydrocarbon radical of abietic acid; $R_1$ is selected from the group consisting of (a) hydrogen, (b) alkyl radicals of 1–6 carbon atoms, (c) hydroxy alkyl radicals of 2–6 carbon atoms and (d) alkylene oxide adducts of said hydroxy alkyl radicals and containing 1–15 moles of alkylene oxide of 2–4 carbon atoms per hydroxy group therein; $R_2$ is selected from the group consisting of (e) alkylene groups of 2–6 carbon atoms, (f) hydroxy alkylene groups 2–6 carbon atoms and (g) alkylene oxide adducts of (f) containing 1–15 moles of alkylene oxide of 2–4 carbon atoms per hydroxy group therein; Q is selected from the group consisting of (a), (b), (c), (d) and $R_3$—(O—$R_4$)$_x$—X; $R_3$ is selected from the group consisting of (h) alkylene groups of 1–4, (i) hydroxy alkylene groups of 3–4 carbon atoms and (j) alkylene oxide adducts of (i) containing 1–15 moles of alkylene oxide per hydroxy group thereof; each $R_4$ is independently selected from the group consisting of (h), (i) and (j); $x$ is 0–15; $y$ is zero or one; X is $SO_3M$ or $OSO_3M$; and M is hydrogen or an alkali metal; $R_5$ is hydrogen or alkyl of 1–4 carbon atoms; and $R_6$ is alkylene of 1–2 carbon atoms.

---

This invention relates to novel compounds and to methods for producing them, and also to novel compositions of matter containing one or more of said compunds as components thereof and also to novel methods for using said compounds and compositions of matter. In one of its more specific aspects the invention is directed to novel salts of certain water soluble, amphoteric surface active agents, to methods for preparing them and also to novel compositions of matter in which one or more of said salts are components thereof and also to novel methods for using said novel salts and compositions of matter. Said novel and unique salts of this invention may be defined as carboxylate salts of said amphoteric, surface active agents, and are within the following generic formula:

I

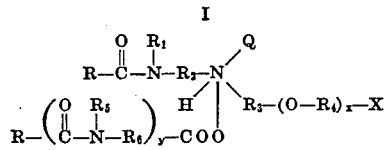

Each R is independently selected from the group consisting of hydrocarbon radicals of at least 6 carbon atoms and generally of 6–24 carbon atoms and R is preferably straight or branch chain saturated or unsaturated aliphatic hydrocarbon whose unsaturation is due solely to ethylenic linkage, that is one or more ethylenic linkages therein, R may be alkylaryl wherein the alkyl portion is at least 6 carbon atoms and the aryl portion is mononuclear or R may be the hydrocarbon radical of abietic acid; $R_1$ is selected from the group consisting of (a) hydrogen, (b) alkyl radicals of 1–6 carbon atoms, (c) hydroxy alkyl radicals of 2–6 carbon atoms and (d) alkylene oxide adducts of said hydroxy alkyl radicals and containing 1–15 moles of alkylene oxide of 2–4 carbon atoms per hydroxy group therein; $R_2$ is selected from the group consisting of (e) alkylene groups of 2–6 carbon atoms, (f) hydroxy alkylene groups of 2–6 carbon atoms and (g) alkylene oxide adducts of (f) containing 1–15 moles of alkylene oxide of 2–4 carbon atoms per hydroxy group therein; Q is selected from the group consisting of (a), (b), (c), (d) and (g) $R_3$—(O—$R_4$)$_x$—X; $R_3$ is selected from the group consisting of (h) alkylene groups of 1–4 and preferably 2–4 carbon atoms, (i) hydroxy alkylene groups of 3–4 carbon atoms and (j) alkylene oxide adducts of (i) containing 1–15 moles of alkylene oxide per hydroxy group thereof; each $R_4$ is independently selected from the group consisting of (h), (i) and (j); $R_5$ is hydrogen or alkyl of 1–4 carbon atoms; and $R_6$ is alkylene of 1–2 carbon atoms, examples of which are $$-CH_2-,\ -\underset{\underset{CH_3}{|}}{C}H-,\ -CH_2-CH_2-$$

$x$ is 0–15; $y$ is zero or one; X is $SO_3M$ or $OSO_3M$; and M is hydrogen or preferably an alkali metal or other cationic equivalent organic or inorganic, including $NH_3$ etc., and for most purposes is sodium or potassium.

I have discovered that said compounds of Formula I could be produced by reacting under certain conditions amphoteric surface active agents within generic formula:

II

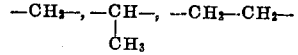

with anionic detergents within the generic formula:

III

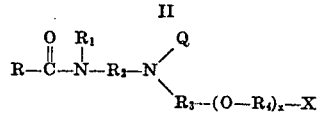

The compounds of Formula II are prepared by first reacting 1 mole of appropriate diamines with 1 mole of appropriate acids (R—COOH) until 1 mole of water of reaction has been produced and removed whereby the amide derivative are produced. Then the resulting amide condensates are reacted with appropriate agents in the conventional manners and conditions to provide compounds of Formula II. Some of said agents are chlorosulfonic acid, propane sultone, hydroxy propane sultone, chorethane sulfate, chlor propane sulfonate, brom methane sulfonic acid, chlor methane sulfonate, chlor ethane sulfonic acid, chlor ethane sulfate, etc.

The compounds of Formula III include the common soaps (R—COOM) and the sodium or potassium salts of amides of certain amino acids produced from said monocarboxylic acids (R—COOH) and said amino acids

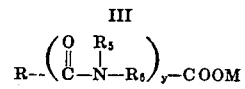

in the manners known to the art. The compounds of Formula III may be used alone or in admixtures of two or more of them or other admixtures, as well as those sold as "Lamapon" and "Maypon," being amides of mixtures of naturally occurring proteins which have been hydrolyzed.

The amphoteric compounds of Formula II are useful as detergent, foaming, wetting, emulgating and emulsifying agents and find application in the fields of shampoos and other cosmetics. They are also useful as surface active agents in the field of treating natural and synthetic fibers in the textile and related fields where they may be employed as synthetic detergents, dye assistants and softeners. However, they do have the disadvantage of being relatively expensive when compared with common soap, of causing a low but some degree of eye stinging and of having a poor hair-lubricity characteristic when compared with common soaps when used for hair shampooing.

While the common soaps are inexpensive and good cleansing agents, they have certain undesirable characteristics, among which are: poor foamability in hard water; when used for shampooing, they sometimes form insoluble salts with the alkaline earth ions present in the water and these salts deposit on the hair thereby imparting a dull appearance thereto and generally require rinses of an acidic nature for their removal; are eye stinging, tend to precipitate at pH of 7 or below, foam poorly at pH of 6–7.

While the amides of said amino acids do exhibit better resistance to hard water when compared with common soaps, but exhibit poor foam and poor foam stability in hard water; they dull hair as do the common soaps but to a lesser extent when used as shampoos; they precipitate out in aqueous media at pH 4.5.

The novel compounds have the following unexpected combination of properties: they are substantially non-eye stinging in those concentrations in which appreciable eye-stinging is evidenced with either compounds of Formulas III or II; they are better foamers than compounds of Formulas III or II in average or hard water; they have good foam stability; they tolerate the presence of chlorine bleaches; they do not dull hair when used for shampooing and consequently no special after rinse is required; they impart softness and manageability to hair which has been shampooed therewith in ordinary as well as hard water; they may be used in shampoos and other cosmetics at pH of 4.5–8.5 and under these conditions are better foaming agents; they are better detergents for cotton with average or hard water; do not precipitate and at pH as low as 4.5; they are non-irritating to the eyes and skin; they are non-toxic when administered orally, or intravenously in amazingly large doses, as determined on rats and mice.

The fatty acids which may be employed for the production of compounds of Formula II are those recited in my U.S. Patent 2,781,376 of Feb. 12, 1957 and some of the diamines which may be used are those diamines recited in said patent as well as others such as ethylene diamine, etc. The condensates produced by the reaction of said fatty acid with diamines may or may not be further reacted to provide alkaline oxide adducts or other appropriate reagents after which they are reacted with appropriate agents which are sultones, halosulfonic acids, halo organo sulfo compounds, examples of which have been heretofore set forth.

Examples of some of the amino acids from which compounds of Formula III are produced are beta-alanine ($NH_2CH_2CH_2COOH$), DL-alpha-alanine and L-alpha-alanine, both represented by the formula $$(CH_3CH(NH_2)COOH)$$

sarcosine ($CH_3NHCH_2COOH$), etc. and the protein hydrolyzates which are mixtures of amino acids produced by the hydrolysis of naturally occurring proteins.

Some specific examples of said reactants employed in the production of the novel salts of this invention are of Formula II shown in the following table and given by way of illustration and not limitation:

| | R | $R_1$ | $R_2$ | Q | $R_3$ | $R_4$ | X | x |
|---|---|---|---|---|---|---|---|---|
| (1) | $C_{17}H_{35}$ | H | $C_2H_4$ | $C_2H_4OH$ | $C_3H_6$ | | s | 0 |
| (2) | $C_{11}H_{23}$ | H | $C_2H_4$ | $C_2H_4OH$ | $CH_2CH(OH)CH_2$ | | s | 0 |
| (3) | Coco | H | $C_2H_4$ | $C_2H_4OH$ | $CH_2CH(OH)CH_2$ | | s | 0 |
| (4) | Coco | H | $C_2H_4$ | q-1 | $C_2H_4$ | $C_3H_6$ | s | 1 |
| (5) | $C_{11}H_{23}$ | $C_2H_4OH$ | $C_2H_4$ | $C_2H_4OH$ | $CH_2CH(OH)CH_2$ | | s | 0 |
| (6) | $C_6H_{13}$ | $C_2H_5$ | $C_3H_6$ | q-2 | $CH_2CH(OH)CH_2$ | | s | 0 |
| (7) | $C_9H_{17}C_6H_4$ | H | $C_2H_4$ | q-2 | $C_3H_6$ | | s' | 0 |
| (8) | $C_{11}H_{23}$ | H | $C_2H_4$ | $C_2H_4OH$ | $C_2H_4$ | | s' | 0 |
| (9) | Coco | H | $C_2H_4$ | $C_2H_5$ | $CH_2$ | | s | 0 |
| (10) | $C_{11}H_{23}$ | H | $C_2H_4$ | q-3 | $C_2H_4$ | $CH_2$ | s | 1 |
| (11) | ab | H | $C_2H_4$ | q-4 | $C_3H_6$ | | s | 0 |

Coco is a mixture of hydrocarbon groups of coconut fatty acid.

q-1 is $C_2H_4OC_3H_6SO_3Na$; q-2 is $$C_2H_4-(O-C_2H_4)_3-OH$$

q-3 is $C_2H_4OCH_2SO_3Na$; q-4 is $C_3H_6SO_3Na$; ab is $C_{19}H_{29}$, the hydrocarbon radical of abietic acid; s is $SO_3M$; s' is $OSO_3M$.

Reactants (1)–(11) may be produced by reacting 1 mole of an appropriate acid (RCOOH) with 1 mole of an appropriate diamine until 1 mole of water of reaction has been produced. This reaction product is then reacted with appropriate sulfates, sulfonates or sultones, with or without having been first reacted with an alkylene oxide, etc. or later reacted with an alkylene oxide, etc. For example Reactant (1) is produced by reacting 1 mole of stearic acid with 1 mole amino ethyl ethanolamine until 1 mole of water has been produced. This reaction product is then reacted with 1 mole of propane sultone and the resultant reaction product is treated with caustic soda. That diamine is used for the production of (1)–(3), (7), and (8); the diamines employed for the production of (5), (6), (9), (4 and 10) and (11) are $C_2H_4OHNHC_2H_4NHC_2H_4OH$,
$C_2H_5NHC_3H_6NHC_2H_4OH$,
$NH_2C_2H_4NHC_2H_5$,
$NH_2C_2H_4N(C_2H_4OH)_2$ and
$NH_2C_2H_4NH_2$ respectively. In the production of (4), (10) and (11) 2 moles of the sultone or sulfonate were used per mole of the organic acid-diamine condensate or alkylene oxide adduct thereof.

Specific examples of some reactants of Formula III given by way of illustration and not limitation are the sodium and potassium soaps of stearic, coconut, oleic, palmitic, lauric, lineoleic, abietic acids and $$C_9H_{19} \cdot C_6H_4 \cdot COOH$$

and those compounds of Formula III when $y$ is 1 and produced by reacting sarcosine, beta-alanine and said alpha-alanines with the aforesaid acids.

The compounds of Formula I are prepared by adding 1-3 moles of (a) one or a combination of two or more compounds of Formula II and 1-3 moles of (b) one or a combination of two or more compounds of Formula III into a quantity of water under agitation and measuring about 1½ times the combined weight of (a) and (b). While being constantly stirred, the pH of the resulting solution is adjusted to about 10–11 by the addition of sufficient aqueous solution of caustic soda (50% conc.). The solution is heated to about 50°–60° C. and maintained at that temperature while there is slowly added thereto, with stirring an aqueous solution of an acidic agent such as phosphoric, citric, hydrochloric, hydroxyacetic, etc. until the pH thereof is lowered to about 8 or below as for example about 7.5 whereby the compounds of Formula I are produced and are present as solutes in the resulting solutions.

Each of said individual specific compounds of Formula II, Reactants (1)–(11), are reacted with each of the specific compounds of Formula III before set forth in the manner heretofore described to provide literally hundreds of different compounds of Formula I.

The many hundreds of specific reaction products of (1)–(11) and said specific soaps (R—COONa) and the $C_{17}H_{35}$, coco, $C_{17}H_{33}$, $C_{15}H_{31}$, $C_{11}H_{23}$, $C_{17}H_{31}$, $C_{19}H_{29}$, $C_9H_{19} \cdot C_6H_4$ amides of sarcosine, beta-alanine, said alpha-alanines; "Maypon" and "Lamapon" are of the Formula I, with the R, $R_1$, $R_2$, Q, $R_3$, $R_4$, X and $x$ of the amphoteric portions being as defined in the table, the R of the RCOO groups thereof being the hydrocarbon radicals of said soaps and the R of the carboxylate portions thereof, when $y$ is 1, being those above set forth.

The foregoing are specific examples of the present invention and are given by way of illustration and not limitation. Some of them, representative of the present invention were subjected to various tests whereby the unusual and unexpected properties and combinations of properties of compounds of Formula I were discovered.

Besides having the unexpected combinations of properties heretofore set forth, representative compounds of Formula I were compared with corresponding compounds produced by reacting compounds of Formula III with compounds which were the same as those of Formula II except that the $SO_3M$ and the $OSO_3M$ groups thereof were replaced by COOM groups. It was found that the resulting compounds, which were carboxylate salts of amphoteric carboxylates, were eye-stinging and therefore were not suitable for use as components in non-eye-stinging shampoos.

In testing various representative compounds of Formula I at .2% concentration using the conventional Ross-Miles test, I was startled to observe that the compound

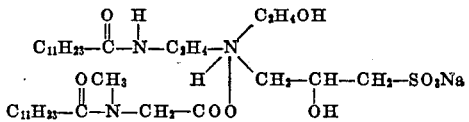

produced 19 cms. of foam, which represented approximately at least 50% greater foam than that obtainable with other compounds, except those of Formula I, which I had previously produced.

Some of the other representative and preferred compounds of Formula I are those wherein each of the R's thereof is independently selected from the group consisting of $C_9H_{19}$—$C_6H_4$, $C_{11}H_{23}$ and coconut fatty acids, and wherein $R_5$ is either hydrogen or methyl and $R_6$ is either $CH_2$, $CH_2$—$CH_2$ or $$\begin{array}{c} CH \\ | \\ CH_3 \end{array}$$

and the carboxylate radical may be mixed amides of "Lamapon" or "Maypon," and those wherein $y$ is zero.

The specific reactants and conditions employable for the production of said reactants (1)–(11) are obvious to those skilled in the art. For example, the sulfonating agent employable for the production of (2), (3), (5) and (6) is my hydroxy propane sultone described U.S. Patent 3,100,779 of Aug. 13, 1963; that employable for the production of (4), (7), (1) and (11) is propane sultone; that employable for the production of (8) is chlor ethane sulfate; that employable for the production of (9) and (10) is $B_rCH_2SO_3H$ or $ClCH_2SO_3H$.

It is also obvious to those skilled in the art that 2 moles of chlorsulfonic acid may be reacted with 1 mole of lauric acid —($NH_2C_2H_4N(C_2H_4OH)_2$) condensate to provide a reactant (12) similar to (10) and differs therefrom in that the Q thereof is $C_2H_4OSO_3M$, and $R_4$ thereof is eliminated and X thereof is $s'$ and $x$ is 0. Compound (13) may be produced by reacting 1 mole of said condensate with 4 moles of ethylene oxide to provide an adduct characterized by $C_2H_4$—$(O—C_2H_4—)_2OH$ being substituted for each of the $C_2H_4OH$ groups thereof and 1 mole of this adduct is reacted with 2 moles of chlorsulfonic acid to provide a compound the same as (10) except that Q thereof is $C_2H_4$—$(O—C_2H_4)_2$—$OSO_3M$, $R_4$ is only $C_2H_4$, X is $s'$ and $x$ is 2. Instead of employing chlorsulfonic acid, hydroxy propane sultone may be employed as the sulfo reactant to provide hydroxy sulfate derivatives.

Still other sulfonating agents may be used and are those unsaturated sulfonic acids and sulfonates disclosed in the U.S. Patent 2,601,256 of June 24, 1952. The sodium allyl sulfonic acid, alpha-methallyl sulfonic acid, allyl oxypropanol sulfonic acid, allyl oxethyl sulfonic acid, methallyl oxyethyl sulfonic acid, etc. and their sodium salts may be reacted with coconut fatty acid $$-(NH_2C_2H_4NHC_2H_5)$$

condensate to provide compounds similar to (9) and differing therefrom in that said unsaturated sulfonates combine directly with the amine nitrogen thereof to provide saturated sulfonate or sulfonic acid substitutes. For example, when allyl sulfonic acid is used as the reactant, the resultant compound is essentially the same as (9) except that $R_3$ is $C_3H_6$; and when the condensate used for the production of (11) is now used and 1 mole thereof is reacted with 2 moles of methallyl oxyethyl sulfonic acid, the compound produced is essentially the same as (11) except that its Q is $$CH_2CH(CH_3)CH_2OCH_2CH_2SO_3M$$

and $R_3$ is $CH_2CH(CH_3)CH_2$ and $R_4$ is $C_2H_4$, X is $SO_3M$ and $x$ is 1.

It is to be understood that compounds of Formulas II and III other than those specifically before set forth may be reacted in the manner heretofore described to provide additional compounds of Formula I. It is also to be understood that while M is preferably sodium or potassium, hydrogen as well as ammonium are equivalents thereof as are those other cation equivalents from amines for example such as amino ethyl amine, etc. It is also to be understood that R, $R_1$, $R_2$, $R_3$, $R_4$, $R_5$, $R_6$, Q, X, M, $x$ and $y$ as they occur throughout this entire description are as first defined.

It is further to be understood that the following claims are intended to cover all the generic and specific features of the invention herein described and all statements of the invention which as a matter of language might be said to fall therebetween.

I claim:
1. A compound of the formula:

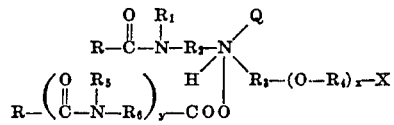

each R is of 6-24 carbon atoms and is independently selected from the group consisting of saturated and unsaturated aliphatic hydrocarbons whose unsaturation is due solely to ethylenic linkage, alkyl-aryl hydrocarbons wherein the alkyl portion is at least 6 carbon atoms and the aryl portion is mononuclear and the hydrocarbon radical of abietic acid; $R_1$ is selected from the group consisting of (a) hydrogen, (b) alkyl radicals of 1-6 carbon atoms, (c) hydroxy alkyl radicals of 2-6 carbon atoms and (d) alkylene oxide adducts of said hydroxy alkyl radicals and containing 1-15 moles of alkylene oxide of 2-4 carbon atoms per hydroxy group therein; $R_2$ is selected from the group consisting of (e) alkylene groups of 2-6 carbon atoms, (f) hydroxy alkylene groups of 2-6 carbon atoms and (g) alkylene oxide adducts of (f) containing 1-15 moles of alkylene oxide of 2-4 carbon atoms per hydroxy group therein; Q is selected from the group consisting of (a), (b), (c), (d) and $R_3$—$(O$—$R_4)_x$—X; $R_3$ is selected from the group consisting of (h) alkylene groups of 1-4, (i) hydroxy alkylene groups of 3-4 carbon atoms and (j) alkylene oxide adducts of (i) containing 1-15 moles of alkylene oxide per hydroxy group thereof; each $R_4$ is independently selected from the group consisting of (h), (i) and (j); $x$ is 0-15; $y$ is zero or one; X is $SO_3M$ or $OSO_3M$; and M is hydrogen or an alkali metal; $R_5$ is hydrogen or alkyl of 1-4 carbon atoms; and $R_6$ is alkylene of 1-2 carbon atoms.

2. A compound according to claim 1, $R_5$ is hydrogen, $R_6$ is $CH_2$—$CH_2$ and $y$ is 1.

3. A compound according to claim 1, $R_5$ is hydrogen, $R_6$ is

and $y$ is 1.

4. A compound according to claim 1, $R_5$ is $CH_3$, $R_6$ is $CH_2$ and $y$ is 1.

5. A compound according to claim 1, $y$ is zero.

6. A compound according to claim 1, $R_1$ is hydrogen, $R_2$ is $C_2H_4$ and Q is $C_2H_4OH$.

7. A compound according to claim 6, $R_5$ is hydrogen, $R_6$ is $CH_2$—$CH_2$ and $y$ is 1.

8. A compound according to claim 6, $R_5$ is hydrogen, $R_6$ is

and $y$ is 1.

9. A compound according to claim 6, $R_5$ is $CH_3$, $R_6$ is $CH_2$ and $y$ is 1.

10. A method for producing a compound of the formula of claim 1 comprising in an aqueous solution of a compound of the formula

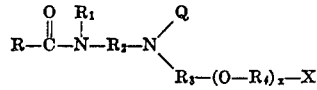

and a compound of the formula

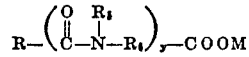

reducing the pH to a value below 8.

11. A method according to claim 10 and heating said solution.

References Cited
UNITED STATES PATENTS 2,781,378  2/1957  Mannheimer _____ 260—401
3,198,815  8/1965  Mannheimer _____ 260—401

FOREIGN PATENTS 981,938  6/1951  France.

DANIEL D. HORWITZ, *Primary Examiner.*

U.S. Cl. X.R.

252—8.75, 102, 161; 260—458, 501.11